United States Patent [19]

Roussy et al.

[11] Patent Number: 5,995,622
[45] Date of Patent: Nov. 30, 1999

[54] HOLDER FOR A TELEPHONE HANDSET, AND ASSEMBLY OF A HOLDER AND A TELEPHONE HANDSET

[75] Inventors: Pascal Roussy; Bertrand Richez, both of Le Mans, France

[73] Assignee: U.S. Philips Corporation, New York, N.Y.

[21] Appl. No.: 08/992,293

[22] Filed: Dec. 17, 1997

[30] Foreign Application Priority Data

Dec. 24, 1996 [EP] European Pat. Off. ............. 96402880

[51] Int. Cl.[6] ........................................ H04M 1/00
[52] U.S. Cl. ........................................ 379/446; 379/455
[58] Field of Search ................................ 379/446, 426, 379/449, 455, 454; 320/2; 455/90, 575

[56] References Cited

U.S. PATENT DOCUMENTS 5,189,698  2/1993  Hakanen ................... 379/455
5,253,292  10/1993  Fluder et al. ............. 379/446
5,659,236  8/1997  Hahn ....................... 320/2

FOREIGN PATENT DOCUMENTS

4015091A1  1/1991  Germany .............. H04M 1/04
4107996A1  9/1992  Germany .............. H04B 1/100
2286744A   8/1995  United Kingdom ...... H04M 1/04

Primary Examiner—Jack Chiang

[57] ABSTRACT

A holder for a telephone handset, in particular for use in cars, which is to provide a hands-free function comprises a stationary holder part and a pivotable holder part which can pivot relative to the former about a holder pivot axis between an open position, in which the pivotable holder part encloses an angle with the stationary holder part, and a closed position, in which the pivotable holder part lies substantially parallel to the stationary holder part. The pivotable holder part has a connector which cooperates with a mating connector of a cordless telephone handset so as to achieve an automatic electrical connection thereof when a cordless telephone handset is inserted.

7 Claims, 6 Drawing Sheets

HOLDER FOR A TELEPHONE HANDSET, AND ASSEMBLY OF A HOLDER AND A TELEPHONE HANDSET

BACKGROUND OF THE INVENTION

The invention relates to a holder for a telephone handset, in particular for use in automobiles for providing a hands-free function, comprising a stationary holder part and a pivotable holder part which is pivotable relative to the stationary holder part about a holder pivot axis between an open position in which the pivotable holder part encloses an angle with the stationary holder part and a closed position in which it is substantially parallel to the stationary holder part.

The invention also relates to an assembly of a holder and a telephone handset.

Such a holder is known, for example, from a German patent application laid open to public inspection ("Offenlegungsschrift") DE-40.15.091 A1. A holder is discussed in this docment which is designed for horizontal mounting, for example on the transmission tunnel of an automobile, and in which a telephone handset can be placed which is connected via a cord to other parts belonging to a mobile communication device. The holder has at a first end a retaining part which grips over the telephone handset and which supports the telephone. At the opposite end, there is a second retaining part which grips over an inserted telephone handset at least adjacent the edge. The first retaining part may be provided with a pivotable holder part.

OBJECTS AND SUMMARY OF THE INVENTION

The invention has for its object to render a holder of the kind mentioned in the opening paragraph suitable also for other, more modern applications.

According to the invention, the holder is for this purpose characterized in that the pivotable holder part is provided with a connector for the electrical connection of a cordless telephone handset when the latter is placed in the pivotable holder part. Many modern mobile telephones have the major advantage that they are cordless, so that they can be used both inside and outside the car without a cord connection. A particularly relevant example here is formed by the GSM telephones which become more and more popular. The presence of a connector in the pivotable holder part renders it possible to connect the telephone handset electrically via this connector quickly and easily for use in a car, for example to supply circuits for supplying the telephone and/or for charging the battery of the telephone handset, and to antenna means of the automobile.

A preferred embodiment of the invention is characterized in that the pivotable holder part is provided with guiding means which, upon the insertion of a telephone handset into the pivotable holder part, guide the telephone handset such that the latter slides home through cooperation with corresponding counter-guiding means present at the sides of the telephone handset. This embodiment envisages first and foremost to render possible a good connection between the connector of the holder and the mating connector of the telephone handset. The guiding means present in the pivotable part of the holder ensure in cooperation with the counter-guiding means present at the sides of the telephone handset that the telephone handset is guided, i.e. slides in an exactly defined manner relative to the pivotable holder, so that the two connectors mentioned above are satisfactorily aligned with respect to one another when they meet one another. The latter embodiment of the invention is in addition of major importance for a further embodiment which is characterized in that the pivotable holder part has a depth perpendicular to the holder pivot axis such that telephone handsets of different thicknesses can be placed in the pivotable holder part. The satisfactory guiding of the telephone handset in the pivotable holder part in combination with the available depth of the holder part renders it possible to accommodate telephone handsets of different thicknesses in the holder, while nevertheless a satisfactory guiding of the telephone handset in the pivotable holder is ensured, i.e. a good cooperation between the connector of the telephone handset and the connector of the pivotable holder. Thickness variations in telephone handsets may be the result, for example, of the use of batteries of different power ratings. The user of a holder according to the invention and a telephone handset suitable therefore may accordingly be sure that the telephone handset can be accommodated in the holder also when a battery of greater power is used.

A further interesting embodiment of the invention is characterized in that the stationary holder part is provided with locking means for cooperation with an inserted telephone handset in a location remote from the pivotable holder part for the purpose of locking the telephone handset in the holder when the pivotable holder part is in the closed position. This renders it possible, after insertion of the telephone handset into the pivotable holder, to pivot the combination of telephone handset and pivotable holder about the pivot axis of the pivotable holder into a closed position, and to lock said combination in the closed position.

An important embodiment in this respect is one which is characterized in that the locking means are present at the end of the holder situated opposite the holder pivot axis, in that the locking means comprise a flap which is pivotable about a flap pivot axis substantially parallel to the holder pivot axis between a locking position in which a telephone handset placed in the holder is locked in the holder and an open, release position in which the telephone handset is pivotable together with the pivotable holder part, in that resilient means are present which load the flap towards the locking position, in that the flap is provided with an operational portion for manually pivoting the flap against the force of the resilient means from the locking position into the open position, and in that the flap is given a hook shape in cross-section at least locally adjacent a free edge at a distance from the flap pivot axis with a sloping, rising portion and a perpendicular portion such that, upon pivoting of a telephone handset placed in the pivotable holder part about the holder pivot axis into the closed position, the flap initially moves in the direction of the release position against the resilient load about the flap pivot axis, and subsequently moves back into the locking position under the influence of the resilient load and locks the telephone handset in the holder by means of said perpendicular portion. The use of this embodiment leads to an automatic locking of the telephone handset when the telephone handset placed in the pivotable holder is pivoted into the closed position. Unlocking may be readily achieved in that said operational portion is moved by hand, whereupon the telephone handset can be taken from the pivotable holder, if so desired with the same hand. A yet further embodiment of the invention is of interest in this respect and is characterized in that resilient means are present for loading the pivotable holder part in the direction of the open position. When this embodiment is used in combination with the preceding embodiment, the telephone handset will be automatically moved towards the user's hand when the operational portion for pivoting the flap into the open position is operated by hand.

BRIEF DESCRIPTION OF THE DRAWINGS

The invention will now be explained in more detail with reference to the diagrammatic drawing which shows a possible embodiment of the invention, to which the latter is not limited, where.

The various Figures are shown on an arbitrary scale and at arbitrary viewing angles, corresponding components being indicated with the same reference numerals in the Figures.

DETAILED DESCRIPTION OF THE PREFERRED EMBODIMENT

Figure 1:
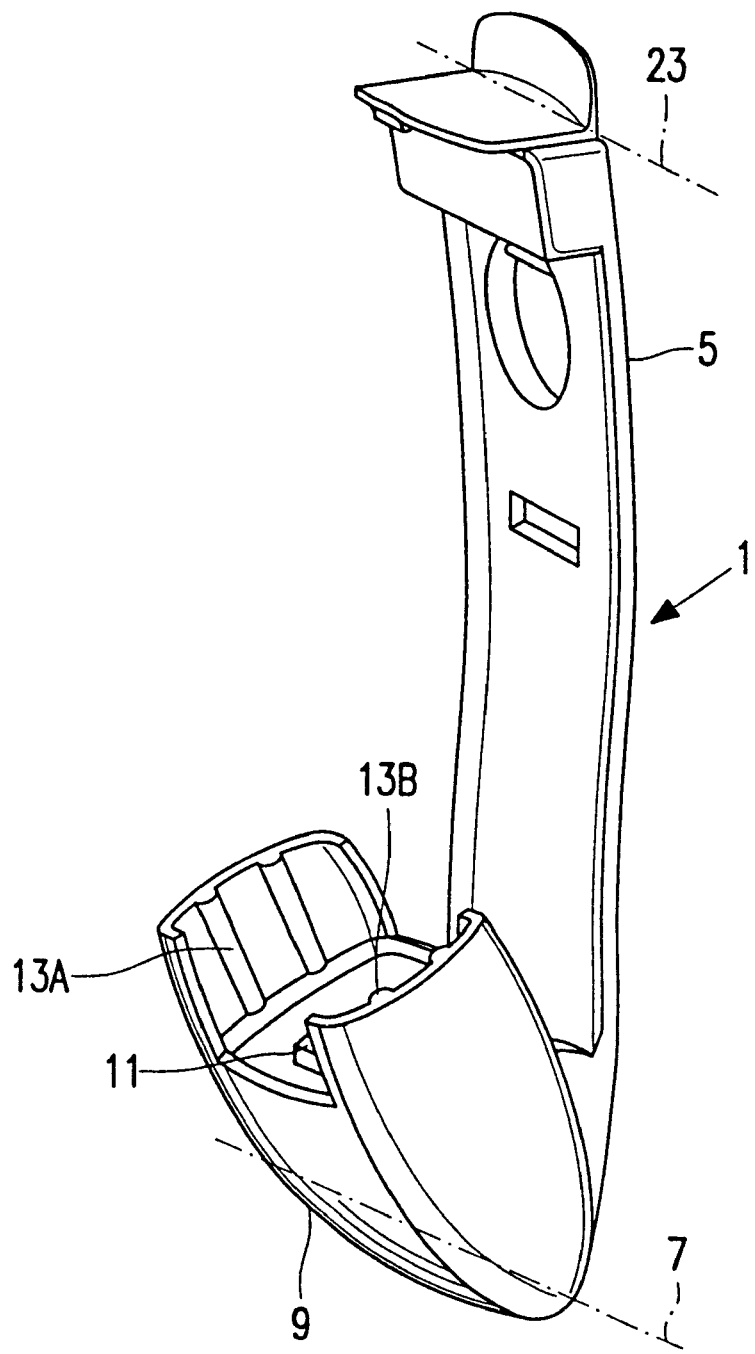
FIG. 1 is a perspective view of a holder according to the invention with the pivotable holder part in the open position.
Figure 2:
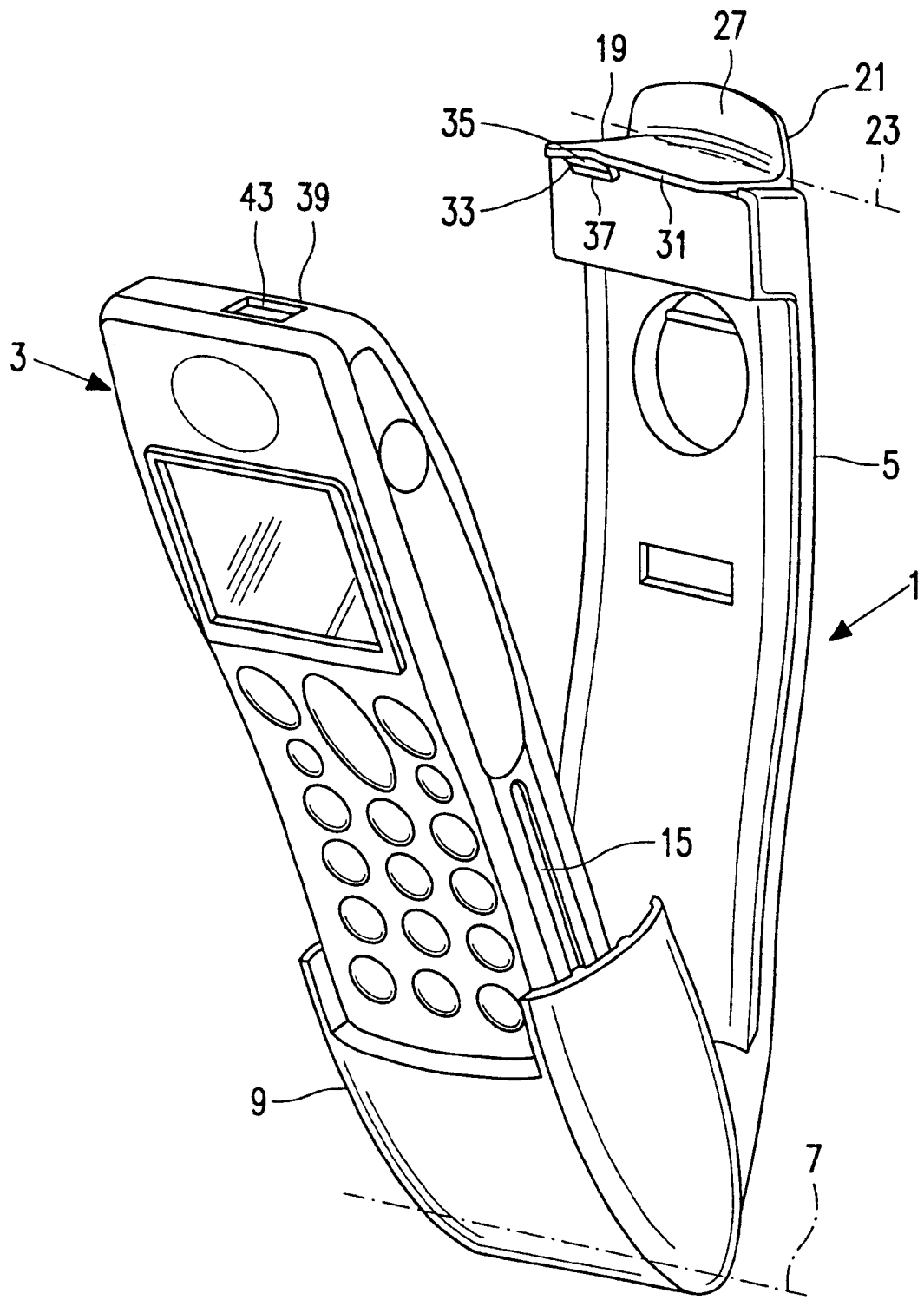
FIG. 2 is a perspective view similar to that of FIG. 1, but with a telephone handset placed in the pivotable holder part.
Figure 3:
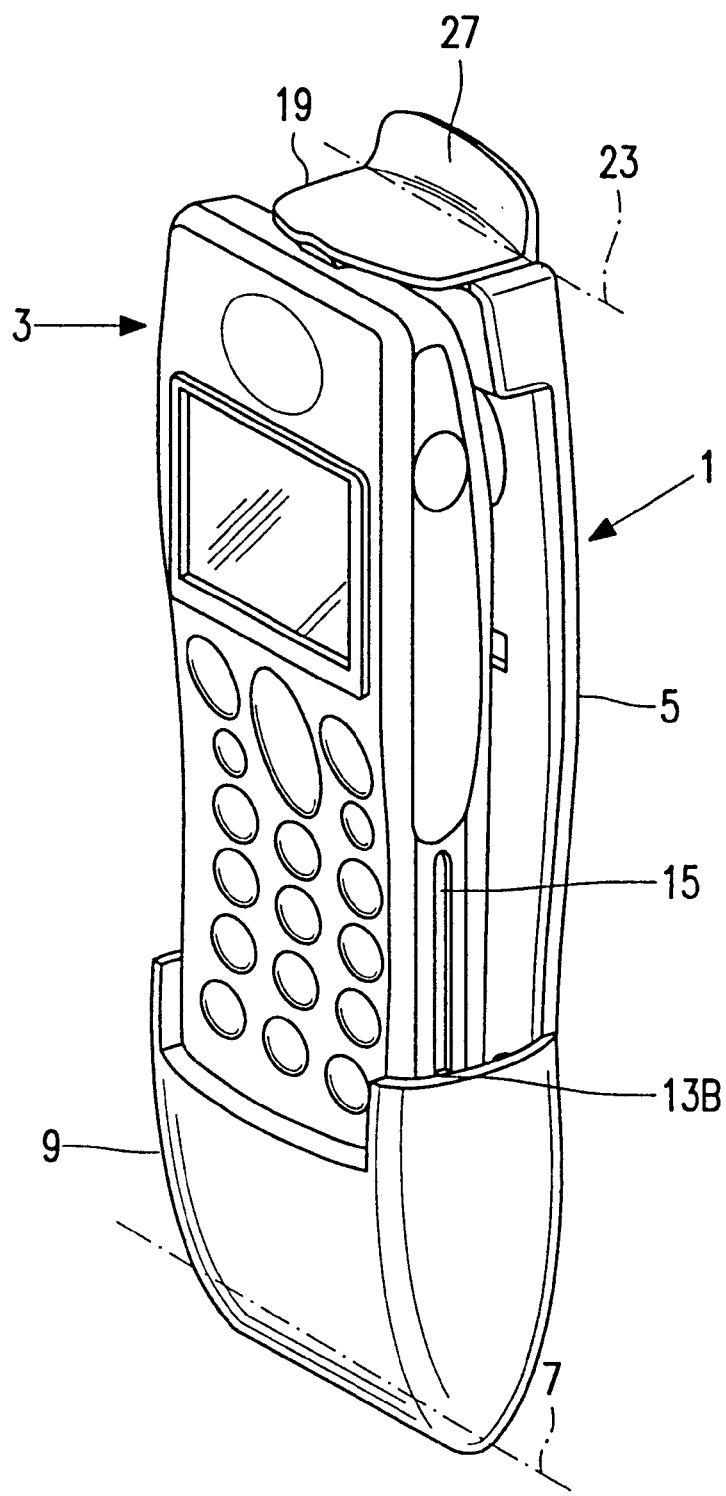
FIG. 3 is a perspective view similar to that of FIG. 2, but now the pivotable holder part is in the closed position with the telephone handset locked.
Figure 4:
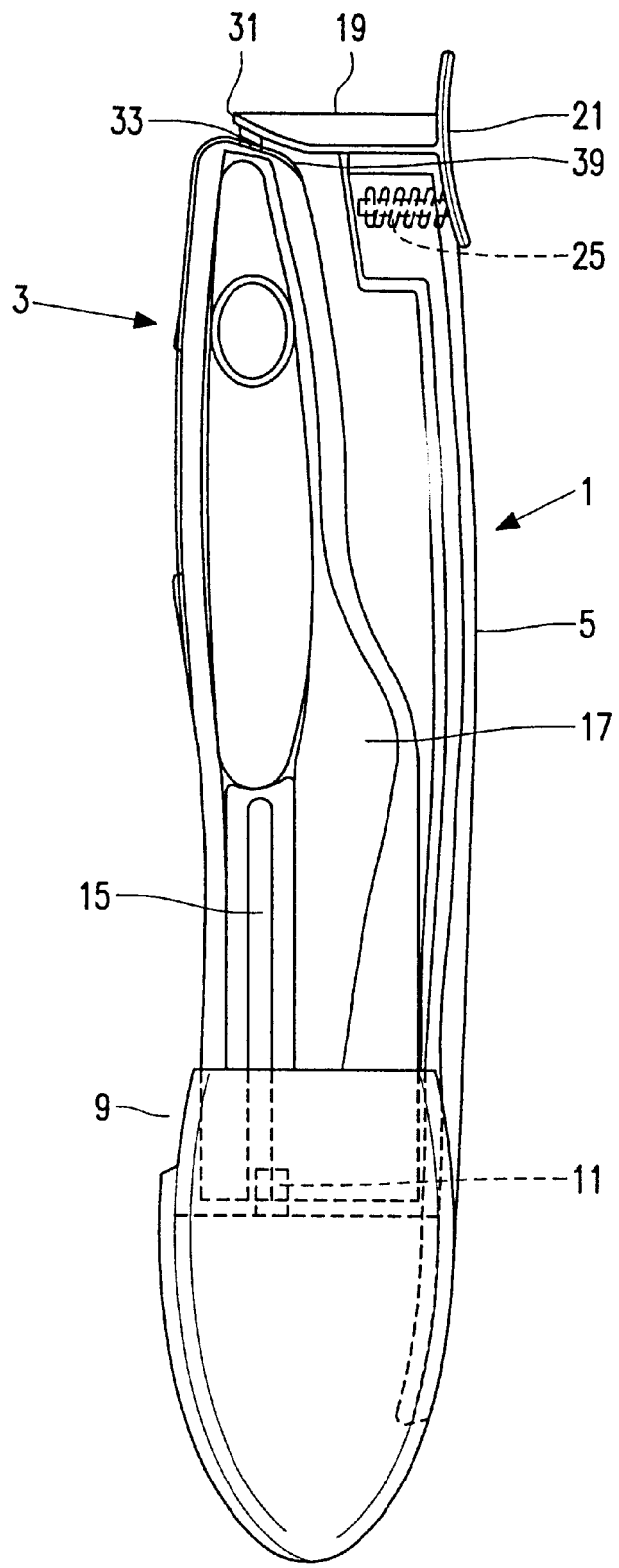
FIG. 4 is a side elevation of the holder with a telephone handset in the situation of FIG. 3, with the stationary holder part partly shown in cross-section.

FIG. 1 shows a holder 1 designed for vertical placement in a suitable location in the interior of a car, for example on or adjacent the dashboard. The holder serves for the placement of a telephone handset 3 which is to provide a hands-free function. The holder 1 comprises a stationary holder part 5 and a pivotable holder part 9 which is pivotable relative to the former part about a holder pivot axis 7. The pivotable holder part is pivotable between an open position, see FIGS. 1 and 2, in which the pivotable holder part encloses an angle with the stationary holder part 5, and a closed position substantially parallel to the stationary holder part, see FIGS. 3 and 4. The pivotable holder part 9 is provided with a connector 11, see FIG. 1. This connector serves for the electrical connection of the cordless telephone handset 3 upon placement thereof in the pivotable holder part. The telephone handset is for this purpose provided with a mating connector, which is not visible in the drawing and which is usual and known per se, near the lower side of the handset.

The pivotable holder part 9 is provided with guiding means in the form of ridges 13a and 13b. Upon insertion of the telephone handset 3 into the pivotable holder part 9, the ridges 13a and 13b will correspond with mating counter-guiding means which are present at the sides of the telephone handset 3, in this case taking the shape of grooves on either side of the telephone handset, one of which, referenced 15, is visible in FIGS. 2 to 4. The cooperation between the grooves 15 provided in defined locations in the sides of the telephone handset 3 and the ridges 13a, 13b present on the inside of the pivotable holder part 9 provides an excellent guiding, i.e. sliding action of the telephone handset when the latter is inserted into the pivotable holder part, such that a satisfactory alignment takes place between the connector 11 of the pivotable holder part and the mating connector present at the lower side of the telephone handset 3. The defined placement of the grooves 15 in combination with the guiding ridges 13a, 13b renders it possible to use telephone handsets of comparatively great thickness, provided with batteries of high power, see FIG. 4, in view of the depth dimension of the pivotable holder part 9 perpendicular to the direction of the pivot axis 7. The battery 17 shown in FIG. 4 and provided on the rear of the telephone handset 3 is the thickest battery in this connection, i.e. the battery having the greatest power which can be used within the available space. It will be obvious, however, that thinner batteries of lower power can accordingly be used in all instances without space problems.

Figure 5:
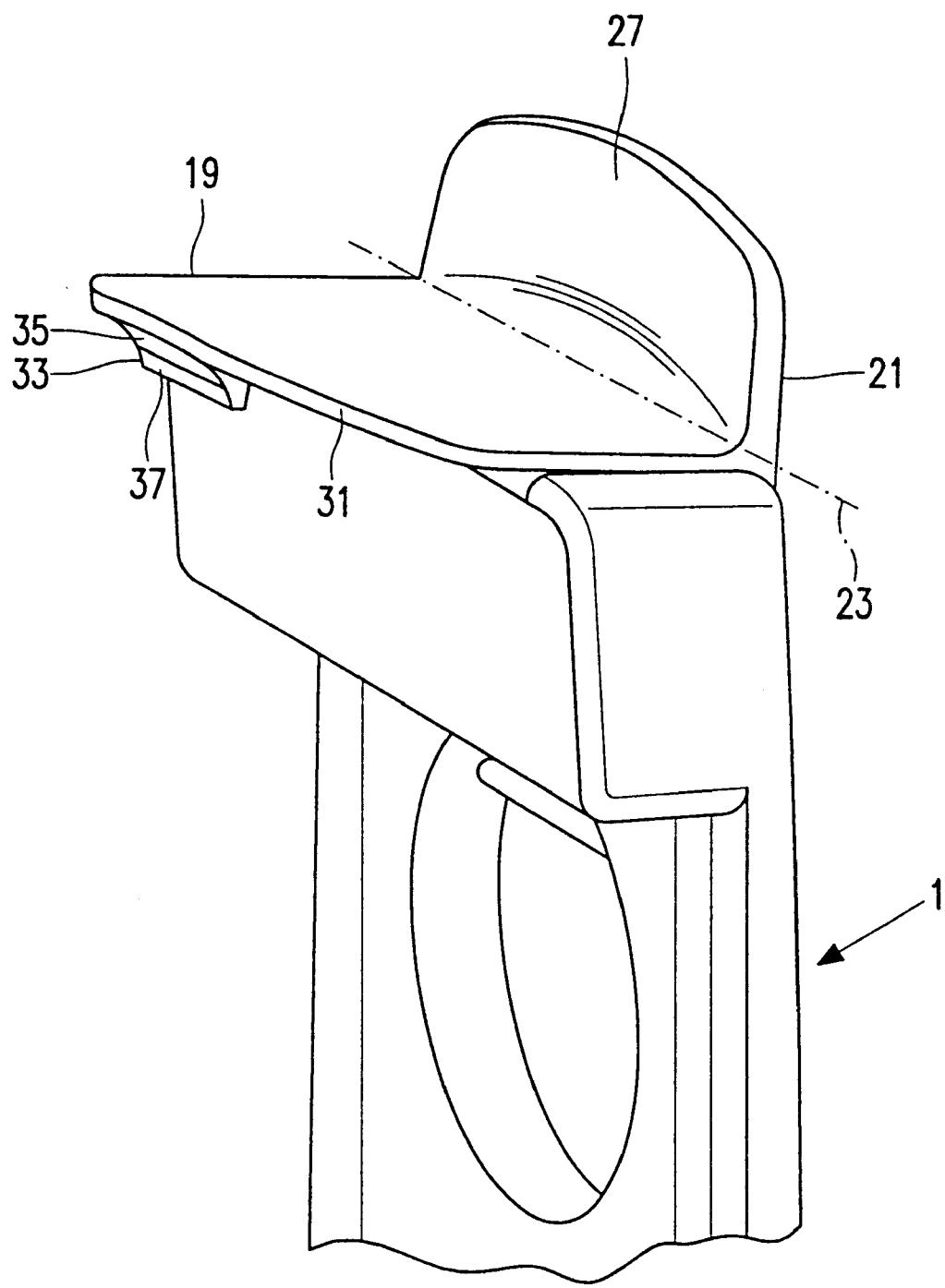
FIG. 5 is a perspective view of a detail of the stationary holder part at the area of the flap, with the flap in the locking position.
Figure 6:
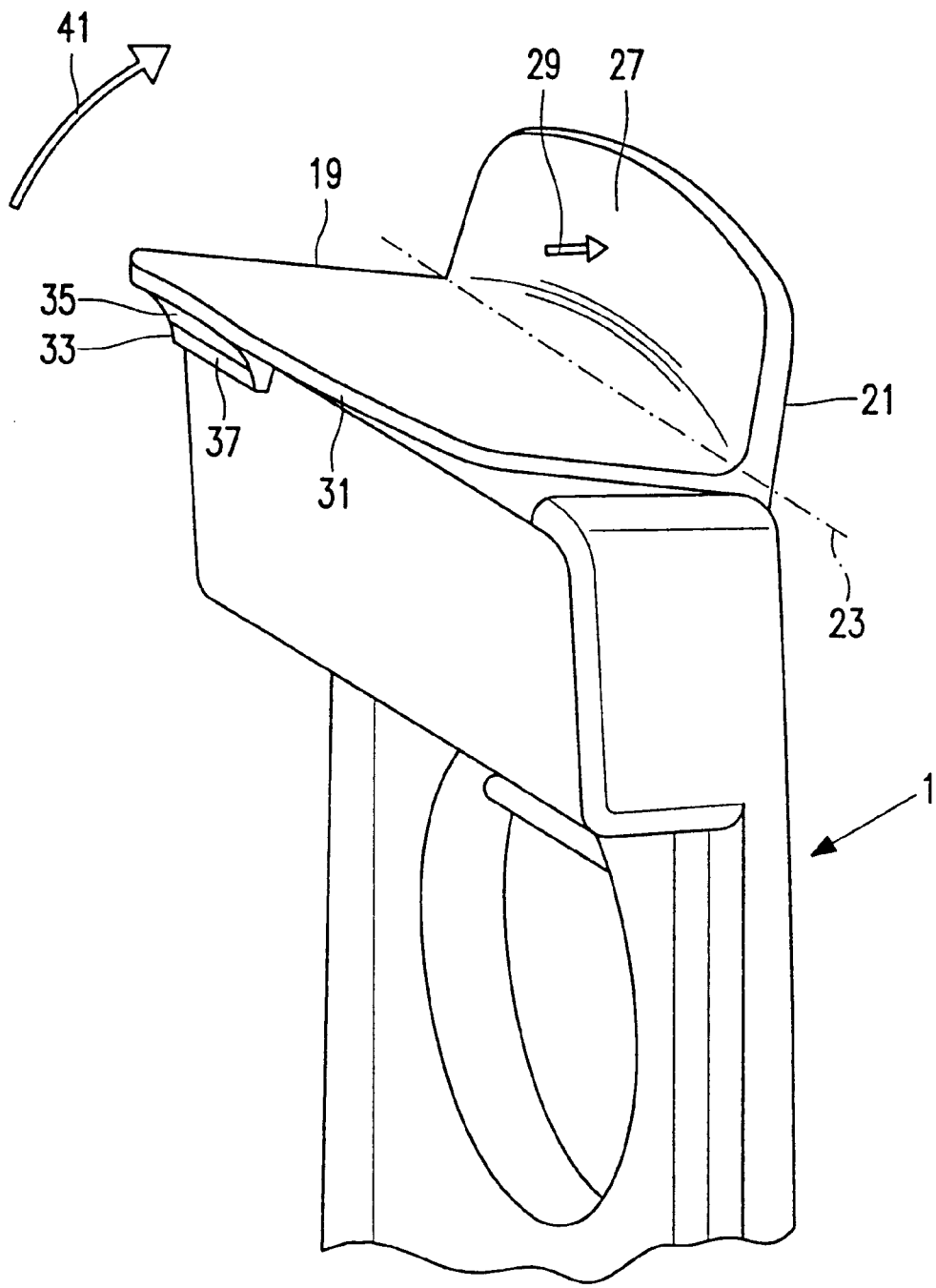
FIG. 6 is an elevation similar to that of FIG. 5 with the flap in the release position.

The stationary holder part 5 is provided with locking means 19 for cooperation with the inserted telephone handset 3 at a distance from the pivotable holder part 9 with the object of locking the telephone handset in the holder 1 when the pivotable holder part 9 is in the closed position. These locking means are present at the end of the holder situated opposite the holder pivot axis 7 and comprise a flap 21 which is pivotable about a flap pivot axis 23 which extends substantially parallel to the holder pivot axis 7. The flap 21 is pivotable between a locking position, see for example FIGS. 3 and 5, in which a telephone handset placed in the holder is locked in the holder, and an open, release position, see FIG. 6, in which the telephone handset is pivotable together with the pivotable holder part. FIG. 5 diagrammatically shows resilient means in the form of a compression spring 25 which load the flap 21 in the direction of the locking position. The flap is provided with a hand operation portion 27 for pivoting the flap 21 by hand from the locking position, see FIGS. 3, 4 and 5, against the pressure of the compression spring 25 into the release position, see FIG. 6. An arrow 29 in FIG. 6 indicates the direction in which a force is to be exerted by hand on the hand operation portion 27 in order to release the telephone handset.

The flap 21 has a hook shape at least locally in cross-section adjacent a free edge 31 remote from the flap pivot axis 23 owing to the presence of a hook portion 33. This hook portion has a sloping, rising portion 35 and an opposed perpendicular portion 37, so that, upon pivoting of a telephone handset placed in the pivotable holder part about the holder pivot axis 7 into the closed position, said sloping portion 35 initially causes the flap 21 to move in the pivoting direction towards the release position of the flap 21 indicated in FIG. 6 with an arrow 41 against the pressure of the compression spring 25 owing to a cooperation with portions 39 of the housing of the telephone handset 3. Subsequently, the flap moves back into the locking position under the influence of the compression force of the compression spring 25, and the telephone handset 3 is locked in the holder 1 by said perpendicular portion 37. It is clearly shown especially in FIG. 2 that the telephone handset is provided with a recess 43 at its upper side. The perpendicular portion 37 of the flap 21 snaps itself automatically into this recess, whereby the locking of the telephone handset is achieved. A recess 43 is not necessary, the flap could alternatively be designed such that it grips around the upper portion of the telephone handset, so that the upper portion of the telephone handset is held in the flap in the locking position.

The pivotable holder part 9 is spring-loaded towards the open position shown in FIG. 1 by resilient means not shown in the drawing. These resilient means may comprise, for example, another compression spring as shown in FIG. 25, or any other kind of spring which is usual and known per se, such as, for example, a blade spring, a torsion spring, etc. If no telephone handset is present in the holder, accordingly, the pivotable holder part will always be in the position shown in FIG. 1. There are also means which are not shown and which are known per se, see, for example, the cited German patent application, for limiting the pivoting movement of the pivotable holder part such that it cannot pivot further than the open position shown in FIG. 1. The holder is accordingly always ready for receiving a telephone handset quickly and in a comfortable direction in its pivotable holder part with sliding possibility into the position shown in FIG. 2. Starting from this position, it suffices to push the telephone by hand against the spring pressure of the pivotable holder part in order to achieve the closed end position shown in FIG. 3. Shortly before reaching this position, the housing part 39 of the telephone handset will make contact with the hook portion 33 of the flap 21, whereby the latter is automatically first pushed up against the pressure of the compression spring 25, whereupon the pependicular portion 37 snaps itself automatically into the recess 43 upon a further movement of the telephone handset. The telephone handset is locked thereby in the closed position and is ready for hands-free operation. For unlocking the telephone handset, a short pressure against the hand operation portion 27 of the flap 21 in the direction of the arrow 29, for example with one or several fingers of the hand, suffices for causing the telephone handset 3 to drop automatically into the palm of the hand, actuated by the resilient means which urge the pivotable holder part 9 automatically into its open position. Then the telephone handset need only be removed from the pivotable holder part 9 in a translatory movement.

The means necessary for the pivotable bearing of the pivotable holder part 9 and of the flap 21 have not been indicated in the drawing for simplicity's sake. Bearing parts of this kind, however, are generally known and may be of any suitable shape. Since these details are not essential to the invention, they have not been shown in the drawing.

Although the invention was elucidated in the drawing with reference to only a single embodiment, the invention is by no means limited thereto. On the contrary, the invention covers all embodiments possible within the scope of the appended claims. The reference numerals in the claims only serve for improving the ease of reference and have no limitative significance.

We claim:

LIST OF REFERENCE NUMERALS

| | |
|---|---|
| 1 | holder |
| 3 | telephone handset |
| 5 | stationary holder part |
| 7 | holder pivot axis |
| 9 | pivotable holder part |
| 11 | connector |
| 13A,B | guiding means (ridges) |
| 15 | groove |
| 17 | battery |
| 19 | locking means |
| 21 | flap |
| 23 | flap pivot axis |
| 25 | compression spring |
| 27 | hand operation portion |
| 29 | hand pressure direction |
| 31 | edge |
| 33 | hook portion |
| 35 | sloping portion |
| 37 | perpendicular portion |
| 39 | housing part of telephone handset 3 |
| 41 | arrow |
| 43 | recess |

1. A vehicle mountable holder for a telephone handset having a keypad and a display, said holder comprising:
   a stationary holder part; and
   a pivotable holder part which is pivotable relative to said stationary holder part about a holder pivot axis between an open position in which said pivotable holder part encloses an acute angle with said stationary holder part and a closed position in which said pivotable holder part is substantially parallel to said stationary holder part;
   said pivotable holder part having an inner shape at least partly matching an outer shape of a lower part of a housing of said telephone handset, said pivotable holder part being formed such that said keypad and display are exposed when said telephone handset is inserted in said pivotable holder part, and said pivotable holder part being provided with a connector for electrical connection to said telephone handset,
   said stationary holder part being provided with locking means for locking said telephone handset into said closed position from said open position, said locking means being present at an end of said holder opposite said holder pivot axis and comprising a flap which is pivotable about a flap pivot axis substantially parallel to said holder pivot axis between a locked position in which said telephone handset is locked in said closed position and a released position for releasing said telephone from said locked position, and in said locked position said telephone handset substantially being comprised within said holder.

2. A holder as claimed in claim 1, wherein said holder comprises first resilient means for loading said flap towards said locked position.

3. A holder as claimed in claim 2, wherein said flap is provided with an operational portion for manually pivoting said flap against the force of said first resilient means from said locked position into said released position, said flap having a hook shape in cross-section at least locally adjacent a free edge at a distance from said flap pivot axis with a sloping portion, a rising portion and a perpendicular portion such that, upon pivoting of said telephone handset about said holder pivot axis into said closed position, said flap initially moves in the direction of said released position, and subsequently moves back into said locked position while locking said telephone handset in said holder by means of said perpendicular portion.

4. A holder as claimed in claim 1, wherein said holder comprises second resilient means for loading said pivotable holder part in the direction of said open position.

5. A holder as claimed in claim 1, wherein said pivotable holder part comprises internal guiding means, and said telephone handset comprises corresponding counter-guiding means present at sides of said telephone handset, said internal guiding means and said counter-guiding means guiding said telephone handset in a home position in which said telephone handset is electrically connected to said connector.

6. A holder as claimed in claim 5, wherein said pivotable holder part has a depth perpendicular to said holder pivot axis such that telephone handsets having a thickness from a thickness range ranging from a first thickness to a second thickness fit in said holder, said second thickness being substantially larger than said first thickness, each of said telephone handsets having said counter-guiding means such that front faces of telephone handsets of different thicknesses are aligned with a front portion of said pivotable holder part.

7. A holder as claimed in claim 6, wherein a telephone handset of said second thickness completely fills up said depth.

* * * * *